United States Patent [19]
Bacskai et al.

[11] Patent Number: 5,641,825
[45] Date of Patent: Jun. 24, 1997

[54] OXYGEN SCAVENGING HOMOGENEOUS MODIFIED POLYOLEFIN-OXIDIZABLE POLYMER-METAL SALT BLENDS

[75] Inventors: Robert Bacskai, Kensington; Ta Yen Ching, Novato; Kiyoshi Katsumoto, El Cerrito, all of Calif.

[73] Assignee: Chevron Chemical Company, San Ramon, Calif.

[21] Appl. No.: 218,496

[22] Filed: Mar. 28, 1994

Related U.S. Application Data

[63] Continuation of Ser. No. 717,369, Jun. 19, 1991, abandoned.

[51] Int. Cl.$^6$ ..................................................... C08K 5/04
[52] U.S. Cl. ..................... 524/398; 524/396; 524/399; 524/403; 524/413; 524/504; 525/66
[58] Field of Search .............................. 525/66; 524/398, 524/399, 396, 403, 413, 504

[56] References Cited

U.S. PATENT DOCUMENTS

| | | | |
|---|---|---|---|
| 4,362,846 | 12/1982 | Korber et al. | 525/66 |
| 4,404,325 | 9/1983 | Mason et al. | 525/179 |
| 4,436,872 | 3/1984 | Flood et al. | 525/179 |
| 4,508,867 | 4/1985 | Sato | 524/434 |
| 4,619,962 | 10/1986 | Sato | 524/401 |
| 4,837,264 | 6/1989 | Zahradnik et al. | 524/381 |
| 5,006,601 | 4/1991 | Lutz et al. | 525/66 |
| 5,013,789 | 5/1991 | Sakuma et al. | 525/66 |
| 5,034,252 | 7/1991 | Nilsson et al. | 428/35.8 |

FOREIGN PATENT DOCUMENTS

| | | |
|---|---|---|
| 2003390 | 11/1989 | Canada . |
| 0263887A1 | 4/1988 | European Pat. Off. . |
| 0301719A1 | 2/1989 | European Pat. Off. . |
| 0335520A1 | 10/1989 | European Pat. Off. . |
| WO90/00504 | 1/1990 | WIPO . |
| WO90/00578 | 1/1990 | WIPO . |
| WO90/12063 | 10/1990 | WIPO . |

OTHER PUBLICATIONS

"Studies on Polymer Blend of Nylon 6 and Polypropylene or Nylon 6 and Polystyrene Using the Reaction of Polymer", F. Ide et al., Journal of Applied Polymer Science, vol. 18, pp. 963–974 (1974).

*Primary Examiner*—Judy M. Reddick
*Attorney, Agent, or Firm*—M. H. Michel; C. D. Holland

[57] ABSTRACT

The invention provides a composition of matter having oxygen scavenger capabilities. The composition comprises a blend of a first polymeric component comprising a polyolefin, the first polymeric component having been grafted with an unsaturated carboxylic anhydride or an unsaturated carboxylic acid, or combinations thereof, or with an epoxide; a second polymeric component having OH, SH or NHR$^2$ groups where R$^2$ is H, C$_1$–C$_3$ alkyl, substituted C$_1$–C$_3$ alkyl; and a metal salt capable of catalyzing the reaction between oxygen and the second polymeric component, the polyolefin being present in an amount sufficient so that the blend is non phase-separated. In the preferred composition maleic anhydride is the grafted material, the second polymeric component is MXD6 nylon and the metal is cobalt. A method of providing a homogeneous blend of a polyolefin with a second polymeric component having OH, SH or NHR$^2$ groups is also set forth. Articles such as containers for foods and beverages utilizing such compositions and/or such method are provided.

17 Claims, 2 Drawing Sheets

FIG. 1B
FIG. 2B
FIG. 3B
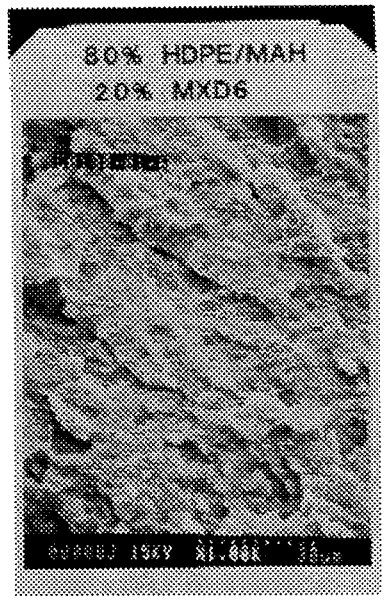

OXYGEN SCAVENGING HOMOGENEOUS MODIFIED POLYOLEFIN-OXIDIZABLE POLYMER-METAL SALT BLENDS

This application is a continuation in part of U.S. Ser. No. 07/717,369, filed Jun. 19, 1991, now abandoned.

TECHNICAL FIELD

The present invention relates to a composition of matter having oxygen scavenger capabilities, to a method of improving the oxygen scavenging capability of polymer-metal salt blends and to articles of manufacture formulated with such blends. The composition of matter is formable into bottles, containers, films and sheets for the packaging of oxygen sensitive foods and beverages.

BACKGROUND OF THE INVENTION

A number of foods, drinks, chemicals, etc., are susceptible to deterioration, putrefaction, denaturation, or the like when brought into contact with the oxygen in air. A number of methods have been practiced in the past for preventing this from occurring. For example, deoxidants have been sealed in containers. Such deoxidants can comprise reductive organic compounds, for example, sulfoxilates, dithionates, or the like. The deoxidants are capable of absorbing oxygen. They can be put in a sealed container or wrapped with a permeable film, together with the foods, drinks, chemical, and the like.

For sealed containers such as food cans, beer cans, juice cans, and the like, the oxygen in the air in the head space or dissolved in the contents of the sealed containers can be replaced with inert gases such as nitrogen or carbon dioxide.

One specific attack on the problem of oxygen leading to deterioration of foods is discussed in European Patent Application 301 719 published Feb. 1, 1989. The aforementioned patent application discloses a wall for a package, which wall comprises or includes a layer comprising a composition comprising a polymer and having oxygen-scavenging properties. The composition scavenges oxygen through the metal-catalyzed oxidation of an oxidizable organic component. The oxidizable organic component is preferably itself a polymer and may be the only polymer in the composition. The preferred composition taught in the aforementioned patent application is a blend of 96% polyethylene terephthalate (PET) and 4% poly (m-xylyleneadipamide) containing 200 ppm cobalt as a catalyst. Rhodium and copper are also taught as being alternative catalysts. Polyamides such as MXD6 are taught as being oxidizable polymers which are of particular interest for use in the composition and process of the aforementioned patent application. The PET is taught as being useful in controlling the permeability to oxygen of the composition. While most of the examples and discussion in the patent application is concerned with the use of PET it should be noted that Examples 10–12 utilize polypropylene (PP) or polyethylene (PE) instead of PET.

Another European Patent Application of interest is Application No. 335 520 published on Oct. 4, 1989. This application incorporates the teaching of European Patent Application 301 719 and utilizes the composition of that application in a sandwich form between other layers, which other layers may comprise a maleic anhydride modified polypropylene. However, there is no teaching of blending of a maleic anhydride modified polypropylene within oxidizable polymer such as a polyamide or with a metal salt catalyst.

Another recent publication of interest is International Publication No. WO 90/00504 which was published on Jan. 25, 1990. This publication discloses a polymer composition for manufacturing containers, intermediate forms or part thereof for improving their oxygen barrier properties. The composition contains as an active component a metal compound having the capacity of scavenging oxygen and consisting of a metal ion having complexing properties and a polymer to which the metal ion is combined as a complex. The polymer composition, in admixture with a further polymer, can be molded into containers, intermediate forms or parts thereof. This publication discloses the use of mixtures of PET and a polyamide for producing plastic materials by injection molding. If such materials also include a metal which complexes with ligands originating from groups and/or atoms present in the polymer, a scavenger effect for oxygen is attained. Listed metals include iron, cobalt, nickel ruthenium, rhodium, palladium, osmium, iridium and platinum. Copper, manganese and zinc are also listed. In addition to the use of PET-polyamide mixtures the use of polyethylene, polypropylene, polyvinylchloride and their copolymers is mentioned. International Publication No. WO 90/00578 includes a similar disclosure.

None of the above-mentioned publications reports a problem which I have discovered, namely, that if containers are prepared from polyolefins, by which is meant polymers wherein the polymer backbone contains substantially only —C—C— units, rather than from PET, for example, from polyethylene, polypropylene, polybutylene or copolymers thereof, or an ethylene copolymer with vinylacetate, with an acrylate such as methyl, ethyl or butyl acrylate, or with an alkyl acrylate such as methylmethacrylate, or mixtures of two or more of the above polymers, and an oxidizable polymer, for example, a polyamide such as MXD6, along with a metal salt, for example a cobalt salt, much poorer oxygen-scavenging is obtained than if PET is used rather than the polyolefin. I have also discovered by utilizing scanning electron microscopy (SEM) that polyolefin-MXD6-cobalt salt blends prepared by melt mixing are inhomogeneous and phase-separated. I believe that this is the main reason why such blends are relatively poor oxygen scavengers when compared to PET-MXD6-cobalt salt blends. The present invention is directed to overcoming the problem as set forth above.

DISCLOSURE OF INVENTION

Utilizing modified polyolefins, which can be prepared, for example, by grafting a compound such as maleic anhydride or the like, acrylic acid, methacrylic acid, fumaric acid, maleic acid or an epoxide containing compound, onto the polyolefin, in place of all or a portion of the unmodified polyolefin, one can obtain homogeneous non phase-separated blends with polyamides such as MXD6. Thereby, the metal salt can be homogeneously dispersed throughout the resulting blend leading to improved oxygen scavenging capability. It should be noted that it is not necessary that all of the polyolefin be modified. Thus, the use of even a relatively small amount of modified polyolefin, along with a relatively major amount of unmodified polyolefin, leads to the formation of a homogeneous non phase-separated blend. If polyolefin alone, unmixed with or instead of such a grafted polyolefin, is used rather than at least an effective amount of such a grafted polyolefin, blending with MXD6 produces an inhomogeneous phase-separated blend. The blend of the invention has superior oxygen scavenging activity to that made using only unmodified polyolefins. The present invention thus allows the use of what are basically inexpensive polyolefins to produce containers and the like which have good oxygen scavenger capabilities. Note also that copolymers of olefins with other unsaturated monomers are also usable in accordance with the present invention and that the term "polyolefin" is, at times, used herein to include such copolymers.

In accordance with one embodiment of the present invention a composition of matter is provided which has oxygen scavenger capabilities. The composition of matter comprises a blend of:

(a) a first polymeric component comprising a polyolefin or a copolymer of an olefin and one or more other unsaturated monomers, the first polymeric component having been grafted with an unsaturated carboxylic anhydride or an unsaturated carboxylic acid such as acrylic acid, methacrylic acid, fumaric acid, or maleic acid, alone or in combination, or with an epoxide;

(b) a second polymeric component having OH, SH or $NHR^2$ groups where $R^2$ is H, $C_1$–$C_3$ alkyl or substituted $C_1$–$C_3$ alkyl; and (c) a metal salt, the first polyolefin being present in an amount sufficient so that the blend is non phase-separated.

In accordance with another embodiment of the invention a composition of matter having oxygen scavenger capabilities comprises a blend of:

(a) a first polymeric component comprising a first polyolefin or the first polyolefin along with a second polyolefin, the first polyolefin being representable by the formula:

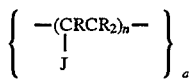

wherein J is either

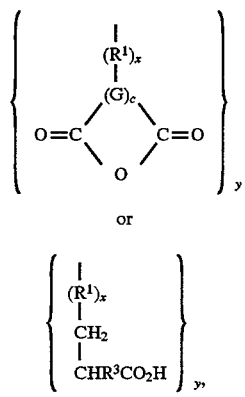

alone or in combination, or

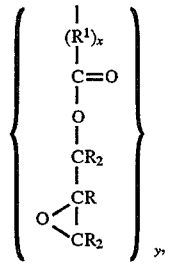

wherein $-(CRCR_2)_n-$ represents the polymer backbone with n=the degree of polymerization, G represents an organic or substituted organic chain having c carbon atoms bridging between the two C=O groups with c=2 or 3, independently each R=hydrogen, a $C_1$–$C_4$ alkyl, a substituted $C_1$–$C_4$ alkyl, or an ester linkage having 2 to 4 carbon atoms, $R^1$=an organic side chain, including but not limited to repeating polymeric units, $R^3$=H or $CH_3$, x=0 or 1 wherein 0 indicates the absence and 1 the presence of the subscripted constituent, and y=the fraction of substituted monomer units, and the second polyolefin being represented by the formula:

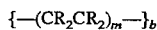

wherein $-(CR_2CR_1)_m-$ represents the polymer backbone with m=the degree of polymerization, a and b represent the weight fractions of the first and second polyolefins in the first polymeric component with a=0.005 to 1, and b=0.995 to 0;

(b) a second polymeric component comprising a polymer representable by the formula:

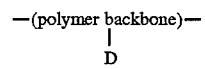

where D=OH, SH or $NHR^2$, D can be on a side chain or can be a chain terminating group of the polymer and more than one type of D can be attached to the polymer backbone and where $R^2$ is H, $C_1$–$C_3$ alkyl or substituted $C_1$–$C_3$ alkyl; and (c) a metal salt, the first polyolefin being present in an amount sufficient so that the blend is non phase-separated.

In another embodiment, the invention comprises a composition of matter having oxygen scavenger capabilities, comprising a blend of:

(a) a first polymeric component comprising a first polyolefin or the first polyolefin along with a second polyolefin, the first polyolefin being represented by the formula:

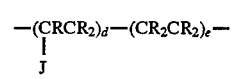

wherein J is either (1)

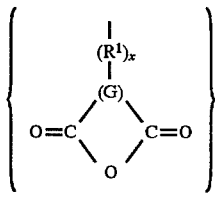

or

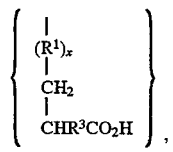

alone or in combination, or (2)

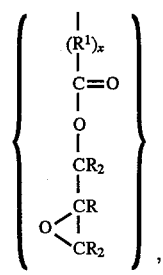

wherein d+e=the degree of polymerization,

G represents an organic chain having 2 or 3 carbon atoms which bridge between the two C=O groups, each R is independently hydrogen, a $C_1$-$C_4$ alkyl, a substituted $C_1$-$C_4$ alkyl, or an ester linkage having 2 to 4 carbon atoms, $R^1$=an organic side chain, including but not limited to repeating polymeric units, $R^3$=H or $CH_3$, x=0 or 1, and d/(d+e)=the fraction of substituted monomer units, and the second polyolefin being represented by the formula:

wherein —$(CR_2CR_2)_m$— represents the polymer backbone with each R individually as defined above and m=the degree of polymerization, wherein the weight fractions of the first and second polyolefins in the first polymeric component are 0.005 to 1, and 0.995 to 0, respectively;

(b) a second polymeric component comprising a polymer represented by the formula:

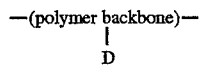

where D=OH, SH or $NHR^2$ and more than one D can be attached to the polymer backbone and where $R^2$ is H, $C_1$-$C_3$ alkyl or substituted $C_1$-$C_3$ alkyl; and (c) a metal salt having the ability to and in an amount sufficient to catalyze reaction of oxygen with the second polymeric component wherein the first polyolefin is present in an amount sufficient so that the blend is non phase-separated.

In another embodiment of the invention, a composition of matter having oxygen scavenger capabilities comprises a blend of:

(a) a first polymeric component comprising a first polyolefin or the first polyolefin along with a second polyolefin, the first polyolefin being representable by the formula:

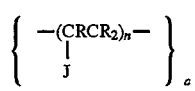

wherein J is either

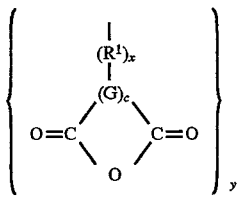

or

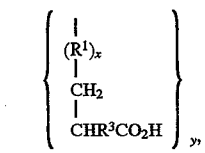

alone or in combination, or

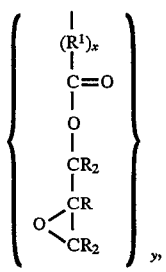

wherein —$(CRCR_2)_n$— represents the polymer backbone with n=the degree of polymerization, G represents an organic or substituted organic chain having c carbon atoms bridging between the two C=O groups with c=2 or 3, independently each R=hydrogen, a $C_1$-$C_4$ alkyl, a substituted $C_1$-$C_4$ alkyl, or an ester linkage having 2 to 4 carbon atoms, $R^1$=an organic side chain, including but not limited to repeating polymeric units, $R^3$=H or $CH_3$, x=0 or 1 wherein 0 indicates the absence and 1 the presence of the subscripted constituent, and y=the fraction of substituted monomer units, and the second polyolefin being represented by the formula:

wherein —$(CR_2CR_2)_m$— represents the polymer backbone with m=the degree of polymerization, a and b represent the weight fractions of the first and second polyolefins in the first polymeric component with a=0.005 to 1, and b=0.995 to 0;

(b) a second polymeric component comprising a polymer representable by the formula:

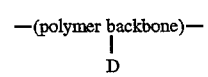

where D=OH, SH or NHR', D can be on a side chain, can be in the polymer backbone, or can be a chain terminating group of the polymer and more than one type of D can be attached to or part of the polymer backbone, and where R' is H, $C_1$–$C_3$ alkyl or substituted $C_1$–$C_3$ alkyl, or aryl or substituted aryl; and (c) a metal salt, the first polyolefin being present in an amount sufficient so that the blend is non phase-separated.

In accordance with still another embodiment of the invention a method is provided of preparing a homogeneous non phase-separated blend of a polyolefin with a polymer having OH, SH or $NHR^2$ functionality. The method comprises blending the polyolefin with the polymer and with a modified polyolefin representable by the formula:

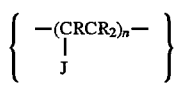

wherein J is either

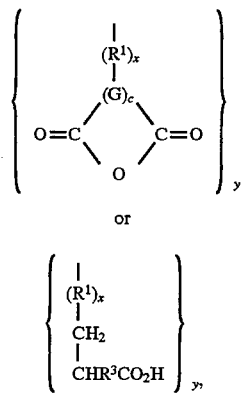

alone or in combination, or

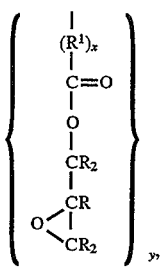

wherein —$(CRCR_2)_n$— represents the polymer backbone with n=the degree of polymerization, G represents an organic or substituted organic chain having c carbon atoms bridging between the two C=O groups with c=2 or 3, independently each R=hydrogen, a $C_1$–$C_4$ alkyl, a substituted $C_1$–$C_4$ alkyl, or an ester linkage having 2 to 4 carbon atoms, $R^1$=an organic side chain, including but not limited to repeating polymeric units, $R^2$ is H, $C_1$–$C_3$ alkyl or substituted $C_1$–$C_3$ alkyl, $R^3$=H or $CH_3$, x=0 or 1 wherein 0 indicates the absence and 1 the presence of the subscripted constituent, and y=the fraction of substituted monomer units, in an amount sufficient to assure production of the homogeneous non phase-separated blend.

Articles of manufacture formulated using the above set forth compositions of matter and/or the above set forth blending method also constitute embodiments of the present invention.

BRIEF DESCRIPTION OF DRAWINGS

The invention will be better understood by reference to the figures of the drawings, wherein:

FIGS. 1A and 1B illustrate scanning electron micrographs of compositions respectively without and with a modified polyolefin;

FIGS. 2A and 2B are similar to FIGS. 1A and 1B but the ratio of polyolefin to polyamide is different than in FIGS. 1A and 1B; and FIGS. 3A and 3B are similar to FIGS. 1A and 1B but the ratio of polyolefin to polyamide is different than that of FIGS. 1A and 1B and then that of FIGS. 2A and 2B.

DETAILED DESCRIPTION OF THE INVENTION

Figure 1A:
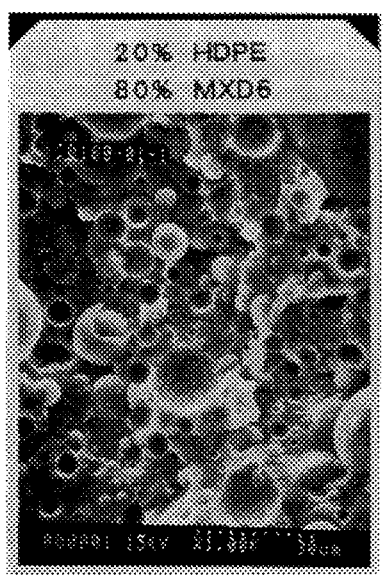

The present invention is concerned with providing a composition of matter and articles of manufacture which can be formulated therefrom, the composition of matter having oxygen scavenger capabilities. The composition of the invention may be used for manufacturing containers such as beverage and food packages, intermediate forms or parts thereof with improved oxygen barrier properties. The compositions of the present invention, in contrast to related prior art compositions, provide homogeneous non phase-separated blends when prepared by melt mixing techniques. They also provide better oxygen scavenging properties. It is believed that the better oxygen scavenging properties are due to the formation of the homogeneous non phase-separated blends. The otherwise structurally similar compositions of the prior art, when melt mixed, produce inhomogeneous phase-separated blends. However, whether the theory that the non phase-separation is what leads to the better oxygen scavenging is correct or not, blended compositions in accordance with the present invention are significantly better oxygen scavengers than the aforementioned structurally somewhat similar prior art compositions.

The first polymeric component which forms a portion of the polymeric composition of the present invention comprises a first polyolefin and may optionally include a second polyolefin, as well, the first polyolefin in having grafted thereto a plurality of side chains. The first polyolefin thus can comprise, for example, polyethylene, polypropylene, polybutylene or copolymers thereof, or an ethylene copolymer with vinylacetate, with an acrylate such as methyl, ethyl or butylacrylate, or with an alkylacrylate such as methylmethacrylate, or mixtures of two or more of the above polymers. Also, terpolymers such as ethylene-acrylate-maleic anhydride terpolymers and the like can serve as all or a portion of the first polymeric component.

The first polymeric component includes the first polyolefin which is represented by the following formula:

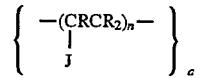

wherein J is either

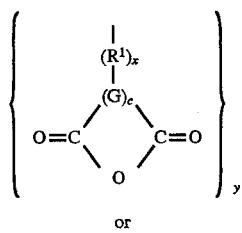

or

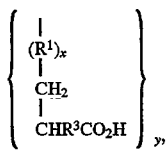

alone or in combination, or

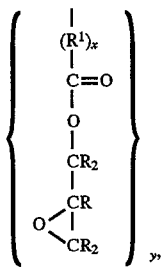

wherein —$(CRCR_2)_n$— represents the polymer backbone with n=the degree of polymerization, G represents an organic or substituted organic chain having c carbon atoms bridging between the two C=O groups with c=2 or 3, independently each R=hydrogen, a $C_1$–$C_4$ alkyl, a substituted $C_1$–$C_4$ alkyl, or an ester linkage having 2 to 4 carbon atoms, $R^1$=an organic side chain, including but not limited to repeating polymeric units, $R^3$=H or $CH_3$, x=0 or 1 wherein 0 indicates the absence and 1 the presence of the subscripted constituent, and y=the fraction of substituted monomer units, and the second polyolefin which is represented by the formula:

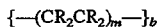

wherein —$(CR_2CR_2)_m$— represents the polymer backbone with m=the degree of polymerization, a and b represent the weight fractions of the first and second polyolefins in the first polymeric component with a=0.005 to 1, preferably 0.03 to 1 and b=0.995 to 0, preferably 0.97 to 0.

The first polymeric component, i.e., the polyolefin component, can be formulated by, for example, reacting an unsaturated organic 1,2- or 1,3-dioic acid anhydride or the like, such as maleic anhydride (cis-butenedioic acid anhydride), with a polyolefin such as polyethylene or polypropylene in the presence of a free radical catalyst such as benzoyl peroxide, dicumyl peroxide, 2,5-dimethyl-2,5-di (t-butylperoxy)hexane, 2,5-dimethyl-2,5-di(t-butylperoxy) hexyne-3, di-t-butyl peroxide, t-butylcumyl peroxide, or the like. Such reactions are well known to one of skill in the art. For example, they can be carried out in an extruder in accordance with the teachings of copending application Ser. No. 395,105 filed Aug. 17, 1989, the disclosure of which is incorporated herein by reference. The grafting can also be carried out separately from an extrusion process.

As an alternative, an appropriate unsaturated carboxylic acid, for example, acrylic acid, methacrylic acid, fumaric acid or maleic acid, can be grafted to the first polyolefin instead of, or in combination with the acid anhydride. The fumaric acid can be grafted to the first olefin by, for example, the procedures set out in U.S. Pat. No. 4,026,967 which is incorporated by reference. The acrylic acid can be grafted as set forth in Modification of Polymers, Polymer Science and Technology, volume 21, page 171 (1982), Plenum Press, editors Carraher and Moore, which is also incorporated by reference. Methacrylic acid can be grafted similarly to acrylic acid. Maleic acid would generally be isomerized to fumaric acid for grafting.

Mixtures of the above and combinations of the above (by which is meant partially anhydride grafted and partially acid grafted, or partially grafted with more than one acid, olefinic polymers) can likewise comprise the first polymeric component.

Alternatively, an epoxy containing side chain may be grafted onto the polyolefin utilizing an unsaturated epoxy compound as a starting material. This can be accomplished by, for example, by reacting glycidyl methacrylate, peroxide and polymer as above. Generally, it is not satisfactory to graft an epoxide in combination with any of the other grafting agents or to utilize an epoxy containing polymer in admixture with polyolefins to which carboxylic acids or anhydrides have been grafted as cross-linking will occur.

Literature methods for carrying out grafting of an epoxy containing side chain can be found in Journal of Applied Polymer Science, 27, 425(1982), which is incorporated herein by reference.

Terpolymers can be formulated, for example, as set forth in U.S. Pat. No. 4,617,366 which is incorporated herein by reference. It should be noted that since each "R" is independently selectable in the above formula the constituent subscripted "b" is defined so as to encompass terpolymers.

The preferred composition of the invention is formulated by grafting maleic anhydride to a polyolefin to produce the first polyolefin.

The amount of the first polymeric component utilized relative to the amount of the second polymeric component utilized may vary within wide ranges. The proportions depend on a number of different factors such as the intended shelf life of the container, the intended barrier effect, economical factors, reuse aspects, and the like. Thus, the proportions between the first and second polymeric components which are admixed into the composition may vary over a broad range, for example from about 1:50 to about 50:1. Generally, however, for the economic reasons the majority of the overall polymer blend composition will be the first polymeric component and often the first polymeric component will be present in an amount by weight of 60% or more.

The weight ratio of the first polyolefin to the second polymeric component, which is what determines that the resulting blend is homogeneous and single phase rather than non-homogeneous and phase-separated, may also fall within a large range. It is a function of the degree of grafting on the first polyolefin, whether the second polyolefin is present at all and if so in what ratio to the first polyolefin, and the particular second polymeric component present. In essence, what is needed is that sufficient of the first polyolefin be present so that the required homogeneous non phase-separated blend results. Good results have been obtained when the first polyolefin to second polymeric component weight ratio falls within a range from about 80:20 to about 20:80 as demonstrated in the Examples below but a wider weight ratio range such as, but not limited to, 95:5 to 5:95 will also give good results. Of course, the amount of each must be greater than zero.

The second polymeric component is one which is readily oxidizable by air at ambient temperature in the presence of the metal salt which forms a part of the composition of matter of the invention. Further, the second polymeric component includes an active hydrogen, by which is meant a hydrogen attached to oxygen, sulfur or nitrogen. Thus, the hydrogen may be part of a hydroxyl group, an amine group or a thio group. In general, the second polymeric component can be represented by the formula:

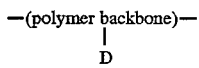

where $D=OH$, $SH$ or $NHR^2$, D can be on a side chain or can be a chain terminating group of the polymer and more than one type of D can be attached to the polymer backbone and $R^2$ is H, $C_1$–$C_3$ alkyl or substituted $C_1$–$C_3$ alkyl. D may also be OH, SH or NHR', D can be on a side chain, can be in the polymer backbone, or can be a chain terminating group of the polymer and more than one type of D can be attached to or part of the polymer backbone, and R' is H, $C_1$–$C_3$ alkyl or substituted $C_1$–$C_3$ alkyl, or aryl or substituted aryl. Thus, the second polymeric component can be a polyol, a polythiol, a polyamide, or the like.

The preferred second polymeric component will comprise a polyamide or copolyamide, the latter being a copolymer of polyamides and other polymers. The polymers can be aromatic or aliphatic. The preferred group of polyamides are the MX nylons, with very good results being attainable with MXD6 nylon. These polyamides contain at least 70 mol percent of structural units obtained from m-xylylenediamine alone or a xylylenediamine mixture containing m-xylylenediamine and p-xylylenediamine and an $\alpha$, $\omega$ aliphatic dicarboxylic acid having 6 to 10 carbon atoms. Such polymers have the ability to coordinate to the metal ions of the metal salt thus, it is believed, promoting their own catalytic oxidation.

Examples of polymers as discussed above include the homopolymers such as poly-m-xylylene adipamide and poly-m-xylylene sebacamide, copolymers such as m-xylylene/p-xylylene adipamide copolymers, m-xylylene/p-xylylene piperamide copolymer and m-xylylene/p-xylylene azelamide copolymers, and copolymers of these homopolymers or copolymer components and aliphatic diamines such as hexamethylenediamine, cyclic diamines such as piperazine, aromatic diamines such as p-bis(2-aminoethyl)benzene, aromatic dicarboxcylic acids such as terephthalic acid, lactams such as ε-caprolactam, ω-aminocarboxylic acids such as ω-aminoheptoic acid and aromatic aminocarboxylic acids such a p-aminobenzoic acid.

The MX nylons may have incorporated polymers such as nylon 6, nylon 66, nylon 610 and nylon 11. One preferred aromatic polyamide is the polymer formed by the polymerization of m-xylene-diamine $H_2NCH_2$—m—$C_6H_4$—$CH_2NH_2$ and adipic acid $HO_2C(CH_2)_4CO_2H$, for example a product manufactured and sold by Mitsubishi Gas Chemicals, Japan, under the designation MXD6. A preferred polyamide of an aliphatic nature is nylon 6.6. The choice of polymers is not critical so long as there are groups and/or atoms in the polymer which have the capacity to contribute to the formation of a complex with the metal.

The formation of polyolefins which have compounds such as maleic anhydride, acrylic acid, methacrylic acid, fumaric acid, maleic acid or epoxy compounds grafted to them is known as are blends of at least some of such compounds with polyamides. Such blends are useful as adhesives and/or as high impact strength molding compounds. Furthermore, such blends may have fillers and reinforcing substances, processing auxiliaries, nucleating agents, pigments and stabilizers, including, inter alia, chalk, quartz, wollastonite, microvite, talcum, calcium stearate, titanium dioxide, carbon black, cadmium sulfide and sterically hindered phenols added to them prior to molding and/or prior to use as adhesives. Such compositions do not, however, act as oxygen scavengers and do not include metal compounds which would catalyze oxidation of the polyamide portion of the blend. Relevant discussions of such blends may be found in, for example, U.S. Pat. No. 4,362,846 of Korber, et al., issued Dec. 7, 1982 and in Canadian patent application 2,003,390 of Abe, et al., all of which are incorporated herein by reference.

In accordance with the invention, the catalytic metal of the metal compound forming the active component in the composition is selected from the group consisting of iron, cobalt, nickel, ruthenium, rhodium, palladium, osmium, iridium, platinum, copper, manganese and zinc. In accordance with a more preferred embodiment of the invention the metal comprises iron, cobalt or nickel, more preferably still, cobalt.

The metal salt may have substantially any anion which does not provide incompatibility problems with the other components or with any food or beverage with which it may be used. Thus, either inorganic or organic anions can be utilized. The metal salt should be relatively uniformly dispersible in the polymeric components. Hence, metal salts wherein the anion is organic are preferred. Good results have been obtained utilizing octoate, as the anion but the octoate was chosen primarily for convenience. Other useful anions include, among many others, 2-ethylhexanoate, naphthenate, dodecanate and hexadecanoate.

The composition of the invention may be prepared in any form, for example as particles or granules.

The amount of the metal present in the polymer composition in accordance with the present invention is not critical as long as the desired effect is obtained. The concentration appropriate in each case can be readily determined by one skilled in the art dependent upon the desired shelf life, etc. Without limitation it has been found that an appropriate amount of the metal would be from about 50 to about 20,000 ppm weight of metal, preferably from about 100 to about 500 ppm. The lower limit is determined by the desired barrier effect, how rapidly it is intended to be attained, the particular first polymeric component utilized, the goods to be packed in the container, and the like. The upper limit is dictated by factors such as economy and toxicity.

The components G, R, $R^1$, $R^2$, and $R^3$ as defined in the above formulas are such that when so defined they will provide non phase-separated blends.

Articles manufactured from a composition in accordance with the present invention present very high oxygen barrier properties. In other words, they provide a substantial capacity to withstand the passage of oxygen. This effect can be the result of the composition absorbing oxygen from its environment and is commonly referred to as a "scavenger" effect. It is believed that the achieving of this scavenger effect is through the formation of an active metal complex, which is only possible if the polymer composition contains groups and/or atoms which have the capacity to coordinate to the metal ion and the polymer chain(s) has the ability to occupy a conformation wherein the groups and/or atoms are present in the correct positions in relation to the metal ion. Another prerequisite is that the metal ion be present at a location in the molecular structure where forming of the complex is possible. The metal complex has ligands originating from groups and/or atoms present in the polymer composition or formed from it.

While not meaning to be bound by theory it is believed that the active metal complex acts irreversibly in that the coordinating oxygen molecule is converted to greatly oxidizing ions, for example ions of superoxides or peroxides, which further react in the organic plastic phase in which they are present (with the oxidizable—second—polymeric component). Thus, it is believed that the metals act in a catalytic manner. Whether or not the theory is correct the key feature in accordance with the invention is the capacity of the polymer composition to scavenge oxygen and as a consequence thereof its capacity to provide improved oxygen barrier properties in containers produced from the polymer composition or in containers where the polymer composition is a part thereof.

The invention will be better understood by reference to the following illustrative experimental examples.

EXAMPLE 1

Prior Art Compositions

Table 1 lists various high density polyethylene(HDPE)-MXD6 blends which were prepared by melt mixing these two components using a twin screw extruder at 270° C. Scanning electron microscopy (SEM) was performed on each of the blends and the results are indicated in Table 1.

TABLE 1

| Blend | SEM Results |
|---|---|
| 20% HDPE<br>80% MXD6 | A continuous phase (probably MXD6) and spheroids of another phase (probably HDPE) (FIG. 1A) |
| 50% HDPE<br>50% MXD6 | A continuous phase and spheroids of another phase (FIG. 2A) |
| 80% HDPE<br>20% MXD6 | A continuous phase (probably HDPE) and spheroids of another phase (probably MXD6) (FIG. 3A) |

The high density polyethylene (HDPE) used was a commercial product of Chevron Chemical Company, Grade 9122. It has a melt index of 48 g/10 minutes at 190° C., 2.16 kg. The MXD6 used was a commercial product of Mitsubishi Gas Chemical Company, Grade 6014. It has a melt index of 27 g/10 minutes at 275° C., 2.16 kg.

Figure 2A:
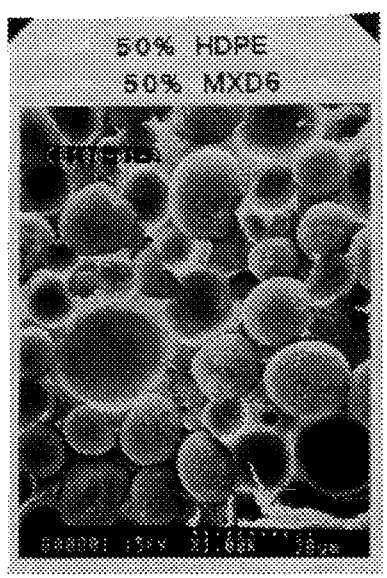
Figure 3A:
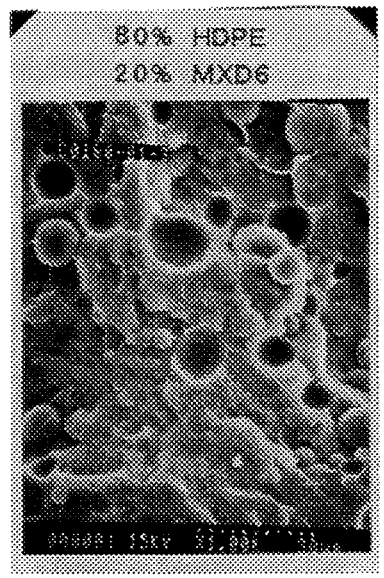

As will be noted by reference to Table 1 and to FIGS. 1A, 2A and 3A, the prior art polyethylene-MXD6 blends are inhomogeneous and show phase-separation.

EXAMPLE 2

Compositions of the Invention

Maleic anhydride (MAH) grafted polyolefins were prepared by reacting HDPE Grade 9122, 1 weight percent MAH and 0.1 weight percent 2,5-dimethyl-2,5-di-(t-butylperoxy)hexane in a twin screw extruder at 180° C. The resulting product had a melt index of 2.2 g/10 minutes. The amount of MAH grafted by this procedure was 0.63 weight percent. The rest of the MAH was evaporated during the reaction. These were then melt mixed in the same twin-screw extruder and under the same conditions as in Example 1 with MXD6, and in some instances cobalt octoate, as well, to produce the compositions listed in Table 2. These compositions were examined by scanning electron microscopy.

TABLE 2

| Blend | SEM Results |
|---|---|
| 80% HDPE<br>15% MAH Grafted HDPE<br>5% MXD6<br>200 ppm Co | A continuous phase |
| 65% HDPE<br>30% MAH Grafted HDPE<br>5% MXD6<br>200 ppm Co | A continuous phase |
| 95% MAH Grafted HDPE<br>5% MXD6<br>200 ppm Co | A continuous phase |
| 20% MAH Grafted HDPE<br>80% MXD6 | A continuous phase (FIG. 1B) |
| 50% MAH Grafted HDPE<br>50% MXD6 | A continuous phase (FIG. 2B) |
| 80% MAH Grafted HDPE<br>20% MXD6 | A continuous phase (FIG. 3B) |

As will be seen by examination of Table 2 and of FIGS. 1B, 2B and 3B, scanning electron microscopy showed that a homogeneous blend was obtained of the maleic anhydride grafted polyolefins with the MXD6 and of the maleic anhydride grafted polyolefins with the MXD6 and the cobalt octoate. This is in contrast to the results set forth in Example 1 and illustrated in FIGS. 1A, 2A and 3A wherein the polyolefins were not grafted with maleic anhydride. As a result, better oxygen scavenging is attainable using the compositions of the present invention as compared with the prior art compositions.

Other polymer films which were tested were prepared by the following methods.

EXAMPLE 3

Preparation of Polymer Films of the Invention from Maleic Anhydride-Grafted Polyolefins Maleic anhydride-grafted polyolefins were prepared by reacting low-density polyethylene (LDPE) (Chevron Grade 1018, having a melt index of about 11 g/10 min.), 0.5 weight percent MAH and 0.05 weight percent 2,5-dimethyl-2,5-di-(t-butylperoxy)hexane (in a 20% blend with a mineral oil, Tufflo 6056) in a twin screw extruder at 180° C. The resulting product had a melt index of approximately 2 g/10 min. The amount of MAH grafted by this procedure was about 0.3 weight percent. The remaining MAH evaporated during the reaction.

These polyolefins were then melt-mixed in the same twin-screw extruder and under the same conditions as in Example 1 with MXD6 and, in some instances, a 20% solution of an organocobalt salt, specifically cobalt neodecanoate in hexane, to produce the compositions listed in Table 3 and Table 5. The solvent was stripped using a vacuum rotary evaporator.

Films were made using a Randcastle Microtruder. The resulting films were kept in a nitrogen atmosphere until tested for oxygen scavenging activity.

EXAMPLE 4

Preparation of Polymer Films of the Invention from a Terpolymer of an Olefin, an Ester, and Maleic Anhydride A commercially-available terpolymer of 80.5 wt. % ethylene, 16 wt. % butyl acrylate, and 3.5 wt. % maleic anhydride (Lotader Grade 3410) was used in place of the maleic anhydride-grafted polyolefins of Example 2. This produced the compositions listed in Table 4.

COMPARATIVE EXAMPLE B

Preparation of Polymer Films of Prior-Art Compositions

The method of Example 2 was followed, except that a commercial polyolefin, LDPE (Chevron Grade 1017, having a melt index of about 7 g/10 min.), was used in place of the maleic anhydride-grafted polyolefins of Example 2. This produced compositions listed in Comparative Table A.

EXAMPLE 4

Testing Procedure

Films produced in Example 2, Example 3, and Comparative Example B were cut into 12 inch lengths at a weight of approximately 4.5 grams. The pieces were about 4 inches wide and about 0.005 inch thick. The pieces were cut into strips about 1 to 2 inches wide, weighed to an accuracy of 0.1 gram, rolled, and placed into a 20 mL vial which contained air (20.9% oxygen). The air in the vial was at ambient relative humidity unless noted otherwise. A Teflon-backed septum was placed over the mouth of the vial, sealing it. The vials were then rapidly heated or cooled to the indicated temperature.

The headspace in a vial was sampled at the indicated time periods. A sample of the air in the vial was taken using a 250 microliter gas-tight syringe which had been purged with helium. With 50 microliters of helium being retained in the syringe, the syringe needle was placed through the septum about one-half inch into a vial. The helium was injected into the vial, and the syringe was purged twice with the contents of the vial. A 50 microliter sample was then withdrawn into the syringe barrel, and the sample was injected immediately into a gas chromatograph which had been calibrated to automatically measure the oxygen content of the sample or into a Mocon 710 oxygen analyzer. Oxygen scavenging results are summarized in the following Tables 3–5 and Comparative Table A.

TABLE 3[1]

| | | PERCENT OXYGEN REMAINING IN THE ATMOSPHERE IN THE VIAL | | | | | | | | | | |
|---|---|---|---|---|---|---|---|---|---|---|---|---|
| | | NUMBER OF DAYS FROM WHEN THE SAMPLE WAS PLACED IN THE VIAL | | | | | | | | | | |
| RUN | T, °C. | 1 | 2 | 3 | 4 | 5 | 6 | 11 | 12 | 14 | 19 | 26 |
| 1 | 5 | 19.9 | | | 17.3 | | 15.0 | 11.3 | | | | 11.8 |
| 2 | 5 | 20.1 | | | 17.8 | | 15.5 | 12.0 | | | | 12.1 |
| 3 | 5 | 20.0 | 18.9 | | | 16.0 | | | 11.4 | 11.3 | 9.5 | 9.4 |
| 4 | 5 | 20.0 | 19.0 | | | 15.9 | | | 11.1 | 10.6 | 9.0 | 8.1 |
| 5 | 5[2] | 20.1 | | | 16.4 | | 13.3 | 9.8 | | | | 5.6 |
| 6 | 5[2] | 20.1 | | | 16.4 | | 13.3 | 9.8 | | | | |
| 7 | 25 | | | 2.5 | | | 3.1 | | | | | |
| 8 | 25 | 13.8 | 4.8 | 2.3 | | | 2.2 | | 2.4 | | | |
| 9 | 25 | 9 | | | 2.9 | | 3.1 | | | | | |
| 10 | 25 | 8.8 | | | 2.9 | | 3.2 | | | | | |
| 11 | 25 | 11.8 | 3.5 | 2.4 | | | 2.2 | | 2.3 | | | |
| 12 | 25 | | | 2.4 | | | 2.8 | | | | | |
| 13 | 25 | 9.5 | | | 2.9 | | 3.1 | | | | | |
| 14 | 25[2] | 17.5 | | | 8.7 | | | | | | | |
| 15 | 25[2] | 17.5 | | | 8.7 | | | | | | | |
| 16 | 55 | | | | 5.5 | | 5.0 | | | | | |
| 17 | 55 | 4.7 | | | 5.0 | | | | | | | |
| 18 | 55 | 4.4 | | | 5.3 | | | | | | | |
| 19 | 55 | 7.0 | 5.2 | 6.3 | | | | | | | | |
| 20 | 55 | 6.4 | 5.2 | 6.3 | | | | | | | | |
| 21 | 55 | | | 5.8 | | | 4.6 | | | | | |

[1]80 wt. % grafted LDPE, 20 wt. % MXD6, 500 ppm Co from cobalt neodecanoate; blanks indicate data was not measured or was unavailable.
[2]These runs had 100% relative humidity in the atmosphere in the vial.

TABLE 4[3]

| | | PERCENT OXYGEN REMAINING IN THE ATMOSPHERE IN THE VIAL | | | | |
|---|---|---|---|---|---|---|
| | | NUMBER OF DAYS FROM WHEN THE SAMPLE WAS PLACED IN THE VIAL | | | | |
| RUN | T, °C. | 0.17 | 1 | 2 | 5 | 9 |
| 22 | 25 | 19.4 | 15.1 | 15.2 | 17.8 | 17.9 |
| 23 | 25 | 19.2 | 12.7 | 11.5 | 14.9 | |
| 24 | 25 | 19.2 | 12.7 | 11.4 | 14.9 | 15.0 |

TABLE 4[3]-continued

PERCENT OXYGEN REMAINING IN THE ATMOSPHERE IN THE VIAL

| RUN | T, °C. | NUMBER OF DAYS FROM WHEN THE SAMPLE WAS PLACED IN THE VIAL | | | | |
|---|---|---|---|---|---|---|
| | | 0.17 | 1 | 2 | 5 | 9 |
| 25 | 55 | 15.3 | 3.9 | 2.9 | 3.1 | 3.9 |
| 26 | 55 | 18.1 | 3.7 | 2.5 | 2.7 | 3.7 |

[3]80 wt. % poly(ethylene, butyl acrylate, and maleic anhydride) (Lotader 3410), 20 wt. % MXD6, 500 ppm Co from cobalt neodecanoate; blanks indicate data was not measured or was unavailable.

TABLE 5[4]

PERCENT OXYGEN REMAINING IN THE ATMOSPHERE IN THE VIAL

| RUN | grafted LDPE % | MXD6 % | ppm Co | NUMBER OF DAYS FROM WHEN SAMPLE WAS PLACED IN VIAL | | | | | | | | | | |
|---|---|---|---|---|---|---|---|---|---|---|---|---|---|---|
| | | | | 0.17 | 0.83 | 1 | 1.83 | 2 | 2.83 | 3 | 4 | 5 | 6 | 6.83 | 7 |
| 27 | 20 | 80 | 500 | 20.9 | | 19.4 | | 18.3 | | | | | | | 16.7 |
| 28 | 50 | 50 | 500 | 19.6 | | 17.5 | | 14.2 | | 13.0 | 11.4 | | | | |
| 29 | 50 | 50 | 500 | 20.4 | | 18.8 | | 18.3 | | | | 18.7 | | | |
| 30 | 70 | 30 | 300 | 19.8 | | 11.0 | | 6.7 | | | | | 4.5 | | |
| 31 | 70 | 30 | 1000 | 19.5 | | 13.3 | | 6.6 | | | 4.1 | | | | |
| 32 | 80 | 20 | 1000 | 19.6 | 15.1 | | 7.5 | | 2.7 | | | | 0.9 | | |
| 33 | 90 | 10 | 300 | 20.5 | | 16.3 | | 14.4 | | | | | 10.2 | | |
| 34 | 90 | 10 | 1000 | 19.2 | | 12.6 | | 6.0 | | | 4.5 | | | | |

[4]Grafted LDPE and MXD6 blends at 25° C.; blanks indicate data was not measured or was unavailable.

COMPARATIVE TABLE A[5]

PERCENT OXYGEN REMAINING IN THE ATMOSPHERE IN THE VIAL

| RUN | T, °C. | NUMBER OF DAYS FROM WHEN SAMPLE WAS PLACED IN VIAL | | | | | | | |
|---|---|---|---|---|---|---|---|---|---|
| | | 0.17 | 1 | 2 | 3 | 4 | 7 | 13 | 21 |
| A | 5 | | 20.4 | 20.0 | 19.4 | | 17.7 | 17.1 | |
| B | 5 | | 20.1 | | 19.6 | | | | |
| C | 5 | | 20.4 | 20.0 | 19.4 | | 17.9 | 17.9 | |
| D | 25 | 19.8 | 15.4 | 20.8[6] | 9.9 | | | | |
| 3 | 25 | 19.8 | 15.9 | 12.7 | 11.5 | | 10.8 | | |
| F | 25 | | 16.3 | 13.2 | 11.3 | | 6.8 | 4.7 | 4.7 |
| G | 25 | | 16.6 | 13.8 | 10.4 | | 5.5 | 3.9 | 3.9 |
| H | 55 | 18.6 | 3.0 | 3.3 | 3.0 | | 4.0 | | |
| I | 55 | | 5.5 | 3.1 | 3.1 | 3.4 | | | |
| J | 55 | 18.2 | 3.8 | 3.8 | 3.4 | | 3.8 | | |
| K | 55 | | 5.2 | 4.9 | 3.5 | 3.2 | | | |

[5]80 wt. % LDPE, 20 wt. % MXD6, 500 ppm Co from cobalt neodecanoate; blanks indicate data was not measured or was unavailable.
[6]Probably due to incorrect sampling; not included in any averages or percentage improvement calculated below.

As can be seen from the previous tables, the films of this invention scavenge oxygen more effectively than prior-art films. The MAH-grafted LDPE and MXD6 blend of this invention scavenged oxygen more quickly at 5° C. and at 25° C. than did the prior art LDPE/MXD6 blend, as is seen from the data of Table 3 and Comparative Table A.

For example, at 5° C., the prior art 80% LDPE/20% MXD6 film took 7 days to reduce the oxygen in a vial to an average of about 17.8%, and the oxygen content was reduced only to an average of about 17.5% after 13 days. The 80% MAH-grafted LDPE/20% MXD6 film of this invention achieved an average oxygen level in a vial of about 15.3% after 6 days and about 11.7% after 11 days at 5° C. Quite surprisingly, when the 80% MAH-grafted LDPE/20% MXD6 film of this invention scavenged oxygen from the air in vials at 5° C. and 100% relative humidity (which is similar to conditions found in a refrigerator), the oxygen scavenging rate was even faster. After 6 days, the average oxygen content in a vial was about 13.3%, and after 11 days, the average oxygen content was about 9.8%.

Similar results were observed at 25° C. The prior art 80% LDPE/20% MXD6 film took 1 day to reduce the oxygen in a vial to an average of about 16.1%, 2 days to produce an average oxygen level of 15.1%, 3 days to produce an average oxygen level of 10.8%, 7 days to produce an average oxygen level of 4.3%, and the level remained constant at about 4.3% through 21 days. The 80% MAH-grafted LDPE/20% MXD6 film of this invention achieved an average oxygen level in a vial of about 10.6% after 1 day, about 4.2% at 2 days, about 2.4% at 3 days, then increased slightly to about 2.7% at 4 days (probably due to air seeping into the vial during sampling), about 2.8% at 6 days, and about 2.4% at 12 days. Clearly, the film of this invention scavenged oxygen more quickly than prior art film. It also appears that the film of this invention absorbed more oxygen from the air than prior art film, producing about 2.4% oxygen by the end of testing v. about 4.3% oxygen by the end of testing of the prior-art films.

Similarly improved oxygen scavenging performance was observed using a film of this invention made with MXD6 and the terpolymer of ethylene, butyl acrylate, and maleic anhydride, as shown in Table 4. This film gave an average oxygen content of 13.5% in a vial at 25° C. after 1 day, and 12.7% after 2 days (the data for 5 days and 9 days show that oxygen had leaked into the test vials). At 55° C., the average oxygen content of a vial containing the MXD6/terpolymer film was about 3.8% after 1 day, about 2.7% after 2 days, and about 2.9% after 5 days. Prior-art film averaged about 4.4% oxygen at 55° C. after 1 day, 3.8% oxygen after 2 days, and about 3.3% oxygen after 4 days. In general, the film of this invention scavenged oxygen more rapidly than prior-art film.

Table 5 shows that films of this invention scavenged oxygen effectively over a wide range of polymer blends and amounts of metal. Generally, as the MXD6 content in the blend increased, the oxygen scavenging rate decreased. Blends which were particularly effective at scavenging oxygen generally did not require very much MXD6, especially when approximately 1000 ppm of the metal were present. A film of 100% MXD6 having 500 ppm Co from cobalt neodecanoate and made by the method of Example 2 scavenged oxygen at 25° C. and ambient relative humidity at the following rate: the oxygen content of air in a sample vial was about 19.4% after 2 days, about 16.2% after 6 days, and about 15.0% after 9 days.

The average oxygen scavenging rates of compositions of this invention generally are at least about 6% greater than the average oxygen scavenging rate of a comparative composition differing from the composition of this invention by having an R moiety in place of the side chain containing an acid, anhydride or epoxide radical, where R is independently hydrogen, a $C_1$–$C_4$ alkyl, a substituted $C_1$–$C_4$ alkyl, or an ester linkage having 2 to 4 carbon atoms. In one embodiment, a composition of this invention has an average oxygen scavenging rate at least about six percent greater than the average oxygen scavenging rate of a composition essentially identical to the composition of this claim, with the exception that the first polymeric component is ungrafted.

Preferably, the average oxygen scavenging rate of a composition of this invention is about 50% greater, and more preferably is about 100% greater, than the average oxygen scavenging rate of a composition differing from the composition of this invention by lacking the side chain containing an acid, anhydride or epoxide radical. The average oxygen scavenging rate can be calculated by determining the amount of oxygen which at least two samples remove from individual sample vials by the method of Example 4, and dividing the amount of oxygen removed by the sample weight and the length of time that the sample has been scavenging oxygen. Thus, two 20 cc vials, each having a beginning oxygen concentration of 20.9% and containing about 4.5 g of polymer sample, and having oxygen contents in the vials of 15.3% and 18.1% after 0.17 day of oxygen scavenging at 25° C., has an average oxygen scavenging rate of:

$$20 \text{ cc} \times [(20.9\% - 15.3\%) + (20.9\% - 18.1\%)] \div 2 \text{ samples} \div 100\% \div 4.5 \text{ g polymer} \div 0.17 \text{ day} = 1.09 \text{ cc } O_2/\text{g polymer-day}.$$

The following Tables 6 summarizes the average oxygen scavenging rate of compositions of this invention and comparative compositions for selected time periods that the samples scavenged oxygen. The percent increase in the average oxygen scavenging rate of compositions of this invention over comparative compositions is also tabulated in Table 7.

TABLE 6

OXYGEN SCAVENGING RATES,
cc $O_2$/g polymer-day

| AVERAGE OF RUNS NUMBERED: | AMOUNT OF TIME THAT THE SAMPLES SCAVENGED OXYGEN | | | |
|---|---|---|---|---|
| | .17 DAY | 1 DAY | 2 DAYS | 3 DAYS |
| COMPARATIVE A–C | | 0.027 | 0.020 | 0.021 |
| 1–4 | | 0.040 | 0.043 | |
| COMPARATIVE D–G | 0.288 | 0.216 | 0.170 | 0.150 |
| 7–13 | | 0.459 | 0.372 | 0.274 |
| 22–24 | 0.426 | 0.329 | 0.182 | |
| COMPARATIVE H–K | 0.654 | 0.734 | 0.381 | 0.261 |
| 16–21 | | 0.679 | 0.349 | 0.221 |
| 25–26 | 1.088 | 0.760 | 0.404 | |

TABLE 7

PERCENT IMPROVEMENT OF $O_2$ SCAVENGING RATE OVER COMPARATIVE EXAMPLES

| AVERAGE OF RUNS NUMBERED: | AMOUNT OF TIME THAT THE SAMPLES SCAVENGED OXYGEN | | | |
|---|---|---|---|---|
| | .17 DAY | 1 DAY | 2 DAYS | 3 DAYS |
| 1–4 OVER COMPARATIVE A–C | | | 50% | 117% |
| 7–13 OVER COMPARATIVE D–G | | | 113% | 118% | 83% |
| 22–24 OVER COMPARATIVE D–G | 48% | 53% | 42% | |
| 16–21 OVER COMPARATIVE H–K | | –8% | –8% | –15% |
| 25–26 OVER COMPARATIVE H–K | 66% | 3% | 6% | |

INDUSTRIAL APPLICABILITY

The present invention provides a composition useful for making articles of manufacture with excellent oxygen scavenging characteristics from inexpensive and readily available polyolefins and provides such articles of manufacture. The articles of manufacture, which can be used as food or beverage containers, exhibit particularly good oxygen scavenging capabilities and are not phase-separated when blended with polyamide type polymers and a metal salt.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A composition of matter having oxygen scavenger capabilities, comprising a blend of:
   (a) a first polymeric component comprising a polyolefin, the first polymeric component having grafted thereto either (1) an unsaturated carboxylic anhydride or an unsaturated carboxylic acid, alone or in combination, or (2) an unsaturated epoxide;
   (b) a second polymeric component having OH, SH or $NHR^2$ groups where $R^2$ is H or $C_1$–$C_3$ alkyl; and
   (c) a metal salt having the ability to and in an amount sufficient to catalyze reaction of oxygen with the second polymeric component, wherein the metal of said metal salt is selected from the group consisting of iron, cobalt, nickel, ruthenium, rhodium, palladium, osmium, iridium, platinum, and manganese, and
   wherein the first polymeric component is present in an amount sufficient that the blend is non phase-separated.

2. A composition of matter as set forth in claim 1, wherein the polyolefin comprises a homopolymer or copolymer of ethylene, propylene, and/or butylene, an ethylene copolymer with one or more of vinylacetate, methyl, ethyl or butylacrylate, or mixtures of two or more of such polymers.

3. The composition of claim 1 wherein the metal of said metal salt is present in an amount between about 50 and about 5000 ppm by weight, based on the total weight of the first and second polymeric components.

4. A composition of matter as set forth in claim 2, wherein the anion of said metal salt is organic.

5. A composition of matter as set forth in claim 1, wherein the second polymeric component comprises a polyamide formed by the polymerization of m-xylylenediamine and adipic acid.

6. A composition of matter as set forth in claim 5, wherein the polyolefin comprises a homopolymer or copolymer of ethylene, propylene, and/or butylene, an ethylene copolymer with one or more of vinylacetate, methyl, ethyl or butylacrylate, or mixtures of two or more of such polymers.

7. A composition of matter as set forth in claim 6, wherein the metal of said metal salt is present in the composition in an amount between about 50 and about 5000 ppm by weight, based on the total weight of the first and second polymeric components.

8. The composition of claim 7 wherein the metal of said metal salt is present in the composition in an amount between about 75 and about 1000 ppm by weight, based on the total weight of the first and second polymeric components.

9. A composition of matter as set forth in claim 7, wherein the anion of said metal salt is organic.

10. A composition of matter as set forth in claim 7, wherein the first polymeric component is grafted with maleic anhydride.

11. The composition of claim 10 wherein the polyolefin of the first polymeric component consists essentially of polyethylene.

12. A composition of matter as set forth in claim 7, wherein the unsaturated carboxylic acid is acrylic acid, methacrylic acid, fumaric acid, or maleic acid.

13. A composition of matter as set forth in claim 1, wherein the first polymeric component is grafted with maleic anhydride.

14. A composition of matter as set forth in claim 1, wherein the composition has an average oxygen scavenging rate at least about six percent greater than the average oxygen scavenging rate of a composition essentially identical to the composition of this claim, with the exception that the first polymeric component is ungrafted.

15. An article of manufacture made from the composition of matter of claim 3.

16. An article of manufacture made from the composition of matter of claim 7.

17. The composition of claim 6, comprising a blend of:

(a) said first polymeric component comprising polyethylene having grafted thereto maleic anhydride;

(b) said second polymeric component comprising a polyamide formed by the polymerization of m-xylylenediamine and adipic acid; and (c) a cobalt salt in an amount sufficient to catalyze reaction of oxygen with the second polymeric component, and wherein the first polymeric component is present in an amount sufficient that the blend is non phase-separated.

* * * * *